J. NEILL.
TOOL FOR CUTTING ABRASIVE FILES.
APPLICATION FILED JULY 23, 1909.
943,953.
Patented Dec. 21, 1909.
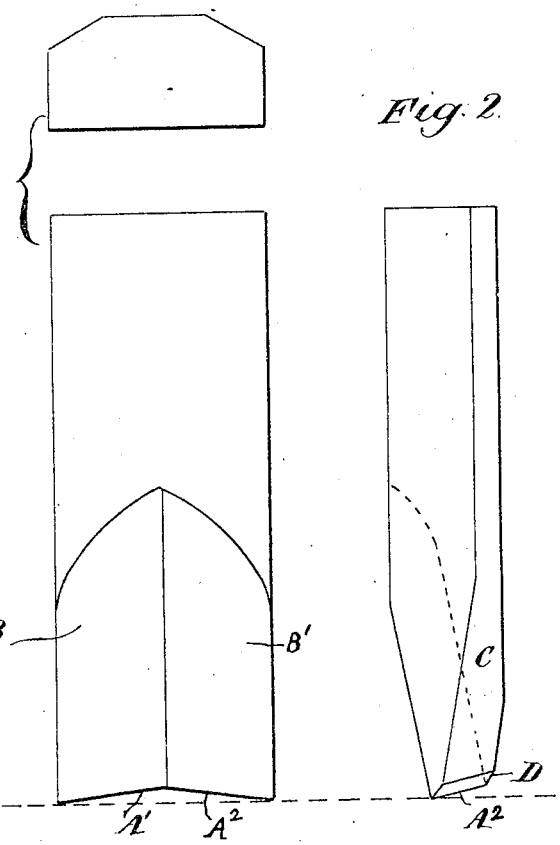
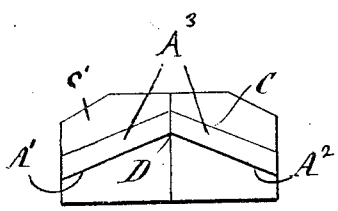
Witnesses:
E. J. Clarkson
Wm. L. Edmonston
Inventor:
James Neill,
By His Attorney,
T. H. Richards.

UNITED STATES PATENT OFFICE.

JAMES NEILL, OF SHEFFIELD, ENGLAND.

TOOL FOR CUTTING ABRASIVE FILES.

943,953.

Specification of Letters Patent. Patented Dec. 21, 1909.

Application filed July 23, 1909. Serial No. 509,140.

*To all whom it may concern:*

Be it known that I, JAMES NEILL, a subject of the King of Great Britain, residing in Sheffield, England, have invented certain new and useful Improvements in Tools for Cutting Abrasive Files, of which the following is a specification.

This invention relates to tools for forming the teeth or cutting portions of implements, especially of files and the like; and has for its object to provide such a tool that will make a cut of an angular nature, or what is known as a herring bone configuration.

In the accompanying drawing representing an embodiment of my invention Figure 1 shows the tool or chisel in front elevation, and in top plan. Fig. 2 is a side elevation; and Fig. 3 is a plan or view of the lower or cutting end.

The tool is made from a blank or shank whose section is somewhat elongated, and at the cutting end are two flat faces B and B′ extending inwardly to form at a slight angle a channel. The rear of the tool has two inclined faces C and C′ extending at an angle to form a ridge or apex.

The bottom edge of the tool has two flat faces $A^1$ and $A^2$ lying in planes that intersect at the ridge or apex of the rear faces C at D, and which planes that extend rearwardly also extend upwardly to give what is termed a negative rake to the cutting edges. When such tool is brought to engage a blank it will cut a complete angular tooth at one cut, that is with one blow or without moving the angle or changing the position of the tool. From such construction the cutting apex or ridge at the middle of the bottom will have a very solid and strong backing whereby undue wear is avoided. This tool will cut the teeth in the file much more quickly and with far greater regularity than could be done by two separate cuts with an ordinary straight edged chisel.

Having now particularly described and ascertained the nature of my said invention and in what manner the same is to be performed, I declare that what I claim is:

A file cutting tool having its front face formed by two plane surfaces extending inwardly at an angle to meet and form a channel, the bottom or cutting edge being formed of two plane surfaces that extend upwardly from the outer edge to meet at the center, and which surfaces are also angularly disposed to give a negative rake to the cutting edge.

JAMES NEILL.

Witnesses:
   ROBERT A. NEILL,
   H. BACKHOUSE.